United States Patent
Bimson et al.

(10) Patent No.: US 7,293,230 B2
(45) Date of Patent: Nov. 6, 2007

(54) INFORMATION ARCHITECTURE FOR THE INTERACTIVE ENVIRONMENT

(75) Inventors: Andrea Bimson, Scottsdale, AZ (US); Jin Chyung, Hamburg (DE); Meena Gopakumar, Glendale, AZ (US); Lorraine Miranda, Phx, AZ (US); Biswajit Sarkar, Phoenix, AZ (US); Shashikant Rao, Phoenix, AZ (US); Kaustubh Kunte, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 862 days.

(21) Appl. No.: 09/769,887

(22) Filed: Jan. 25, 2001

(65) Prior Publication Data

US 2001/0034748 A1    Oct. 25, 2001

Related U.S. Application Data

(60) Provisional application No. 60/178,456, filed on Jan. 27, 2000.

(51) Int. Cl.
  *G06F 15/00* (2006.01)
(52) U.S. Cl. ............ 715/530; 715/513; 715/500
(58) Field of Classification Search ........ 715/513, 715/501.1, 517, 500, 522, 530; 709/206, 709/227
  See application file for complete search history.

(56) References Cited

U.S. PATENT DOCUMENTS

| | | | | |
|---|---|---|---|---|
| 5,649,186 A | * | 7/1997 | Ferguson | 707/10 |
| 5,778,368 A | * | 7/1998 | Hogan et al. | 707/10 |
| 5,852,713 A | | 12/1998 | Shannon | |
| 5,860,068 A | | 1/1999 | Cook | |
| 5,860,073 A | * | 1/1999 | Ferrel et al. | 715/522 |
| 5,877,519 A | * | 3/1999 | Jewell | 257/190 |
| 5,945,989 A | * | 8/1999 | Freishtat et al. | 715/760 |

(Continued)

FOREIGN PATENT DOCUMENTS

WO    WO 97 15018 A    4/1997

OTHER PUBLICATIONS

JAXO Ltd., XGATE—White Paper; The enterprise, its data and XGate,www.jaxo.com, Dec. 6, 1998, the whole document.

(Continued)

*Primary Examiner*—Stephen Hong
*Assistant Examiner*—Thu Huynh
(74) *Attorney, Agent, or Firm*—Snell & Wilmer L.L.P.

(57) ABSTRACT

A system and method for providing management such as creation, manipulation, storage, control, and retrieval of digital content for a company on a global basis. Digital content is created and stored in, for example, the eXtensible Markup Language (XML) format using the relationship between component mapping information and content information comprising webpage components. The XML data is developed by defining page components, mapping the components on a page and indexing the page for future retrieval of the page. The data is then stored in a single database, as segments related to the page, for call-up by a user. The information architecture of the present invention provides for a separation of data from the presentation itself. Thus, the information architecture data content, not being tied to the presentation, may, for example, enable the database to support various foreign languages, formats and medias.

8 Claims, 5 Drawing Sheets

U.S. PATENT DOCUMENTS

| | | | |
|---|---|---|---|
| 5,970,490 A | 10/1999 | Morgenstern | |
| 5,983,267 A | 11/1999 | Shklar et al. | |
| 5,999,179 A | 12/1999 | Kekic et al. | |
| 6,003,032 A | 12/1999 | Bunney et al. | |
| 6,005,568 A | 12/1999 | Simonoff et al. | |
| 6,011,844 A | 1/2000 | Uppaluru et al. | |
| 6,012,098 A | 1/2000 | Bayeh et al. | |
| 6,012,984 A | 1/2000 | Roseman | |
| 6,018,343 A | 1/2000 | Wang et al. | |
| 6,018,710 A | 1/2000 | Wynblatt et al. | |
| 6,021,202 A | 2/2000 | Anderson et al. | |
| 6,021,416 A | 2/2000 | Dauerer et al. | |
| 6,026,433 A * | 2/2000 | D'Arlach et al. | 709/217 |
| 6,052,514 A * | 4/2000 | Gill et al. | 715/733 |
| 6,088,702 A * | 7/2000 | Plantz et al. | 707/103 R |
| 6,112,242 A * | 8/2000 | Jois et al. | 709/225 |
| 6,192,382 B1 * | 2/2001 | Lafer et al. | 715/513 |
| 6,321,256 B1 * | 11/2001 | Himmel et al. | 709/218 |
| 6,411,178 B1 * | 6/2002 | Matsumura et al. | 333/134 |
| 6,424,979 B1 * | 7/2002 | Livingston et al. | 715/511 |
| 6,429,880 B2 * | 8/2002 | Marcos et al. | 715/744 |
| 6,430,624 B1 * | 8/2002 | Jamtgaard et al. | 709/264 |
| 6,463,440 B1 * | 10/2002 | Hind et al. | 707/102 |
| 6,519,617 B1 * | 2/2003 | Wanderski et al. | 715/513 |
| 6,591,248 B1 * | 7/2003 | Nakamura et al. | 705/14 |
| 6,598,219 B1 * | 7/2003 | Lau | 717/108 |
| 6,606,731 B1 * | 8/2003 | Baum et al. | 716/3 |
| 6,643,663 B1 * | 11/2003 | Dabney et al. | 707/102 |
| 6,662,342 B1 * | 12/2003 | Marcy | 715/513 |
| 6,697,822 B1 * | 2/2004 | Armatis et al. | 707/204 |
| 6,715,129 B1 * | 3/2004 | Hind et al. | 715/513 |
| 6,732,330 B1 * | 5/2004 | Claussen et al. | 715/513 |
| 6,738,803 B1 * | 5/2004 | Dodrill et al. | 709/218 |
| 6,795,830 B1 * | 9/2004 | Banerjee et al. | 707/200 |
| 7,072,853 B2 * | 7/2006 | Shkedi | 705/14 |
| 2001/0013004 A1 * | 8/2001 | Haris et al. | 705/1 |
| 2002/0091725 A1 * | 7/2002 | Skok | 707/501.1 |

OTHER PUBLICATIONS

Ciancarini P et al.; Managing Complex Documents over the www: A case study for XML; IEEE Transactions on Knowledge and Data Engineering, Jul. 1999, pp. 629-638, vol. 11, No. 4, IEEE Inc., New York, US.

Zhang, Z., Heuer, A., Engel, T., Meinel, C., Daphne—A Tool for Distributed Authoring and Publishing, Proceedings of the Annual Conference of American Society of Information Science, ASIA '99, Nov. 1999, pp. 1-15, http://www.citeseer.nj.nec.com/198653.html.

Wang, W., Team-and-Role-Based Organizational context and Access Control for Cooperative Hypermedial Environments, Proceedings of ACM Hypertext '99, Feb. 23-25, 1999, pp. 37-46, http://www.citeseer.nj.nec.com/220853.html.

Peters, R et al, CrystalWeb—A distributed authoring environment for the World-Wide Web, Computer Networks and ISDM Systems, Apr. 1, 1995, pp. 861-870, vol. 27, No. 6, North Holland Publishing, Amsterdam, NL.

\* cited by examiner

INFORMATION ARCHITECTURE FOR THE INTERACTIVE ENVIRONMENT

CROSS REFERENCE TO RELATED APPLICATIONS

This application claims the benefit of U.S. Provisional Application No. 60/178,456, filed Jan. 27, 2000, the entire contents of which are incorporated by reference.

FIELD OF THE INVENTION

The invention relates generally to methods and apparatus for managing content of a company-wide intranet or internet website, and more particularly, to systems for organizing data related in a single database so the content can be managed from a global perspective.

BACKGROUND OF THE INVENTION

As more and more companies begin to provide a presence on the internet, they are confronted with the issues of presentation of information and conformity within the preparation of the presentations. Various schemes have been presented to assist the companies in preparing the presentation screens that would appear on the internet website, along with placing the presentation of the page in a location or locations that are linked, requiring a user to traverse various web pages to obtain the presentation desired. Such approaches have included delegated authority systems, have used content aggregation, have provided graphical interfaces and dynamically generated web documents. Other general website management has included editing and generating information, data access/processing systems, automatic publishing systems and group ware systems. These approaches generally demand a knowledge of the HTML operating language, a capability generally only found in the website programmers and not among general employees.

The prior art generally fails to disclose a process for implementing changes to an internet website, such that employees in a corporation may define and enforce a common style of page layout to provide an application that can be accessed by multiple users at the same time by an internet browser, where the application allows corporate employees to manage content, create new web pages, process content through workflow, and define new content and style which can then be provided to a user without an undue amount of searching to find the desired information. Accordingly, once the presentation page is completed, data elements relating to the significance of the content are utilized to store information relating to the content in various locations or sites, with the various sites interconnected through the use of links. Thus, to obtain the information desired, a user may, of necessity, be forced to traverse several links to obtain the desired page with the desired information.

SUMMARY OF THE INVENTION

The previously described deficiencies in the prior art are addressed in the present invention which, in conjunction with a content management application, provides an intranet application to provide a system for implementing changes to both an intranet or an internet website and, permitting a company to manage content for its website from a global perspective. The content, created and stored once, can then be shared and managed across a global organization. The information architecture is the basic underlying infrastructure that allows a company to efficiently manage its content while taking advantage of various efficiencies. The data can thus be viewed from a holistic perspective utilizing a structure of website contents that results from the relationship between objects on the physical pages, i.e., appearance only, instead of the prior art reliance on the significance of the data elements displayed on the page, thereby providing a look and feel driven structure. The system function supports a workflow model for the launching of content and is extensible so the information architecture does not need to be expanded in order to support new data. Further, the system is platform and software independent whereby the content stored in the infrastructure can be delivered on any platform with the system providing granularity of content management. In one exemplary embodiment, the system makes use of the eXtensible Markup Language (XML) to store relevant content. The use of XML provides extensible data schema, content reuse, also known as repurposing, and flexible look and feel. Since the information architecture is XML based, it can be implemented either using a database, XML repository or a flat file based system.

BRIEF DESCRIPTION OF THE DRAWINGS

The above and other features and advantages of the present invention are hereinafter described in the following detailed description of exemplary embodiments to be read in conjunction with the accompanying drawing figures, wherein like reference numerals are used to identify the same or similar parts or steps in the similar views, and.

DETAILED DESCRIPTION OF EXEMPLARY EMBODIMENTS

The present invention may be described herein in terms of functional block components and various processing steps. It should be appreciated that such functional blocks may be realized by any number of hardware and/or software components configured to perform the specified functions. For example, the software elements of the present invention may be implemented with any programming or scripting language such as C, C++, Java, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As hereinafter described, the present invention is directed to a system and method for providing management such as creation, manipulation, storage, control, and retrieval of digital content for use in such as a company website on a global basis and includes support for new page layouts and component layouts (i.e., support for new presentation styles whether in Hypertext Markup Language (HTML), Wireless Markup Language (WML), PDF, or any other authoring language in which the presentation may be written).

Further, the present invention permits content repurposing, i.e., the reuse of existing content for other forms of media once the content has been produced and stored in a database. Accordingly, repurposing permits use of the content in such forms as mail, print, other websites or any application in which the printed or electronic word is used and which may take advantage of the content stored in the database.

Figure 1:
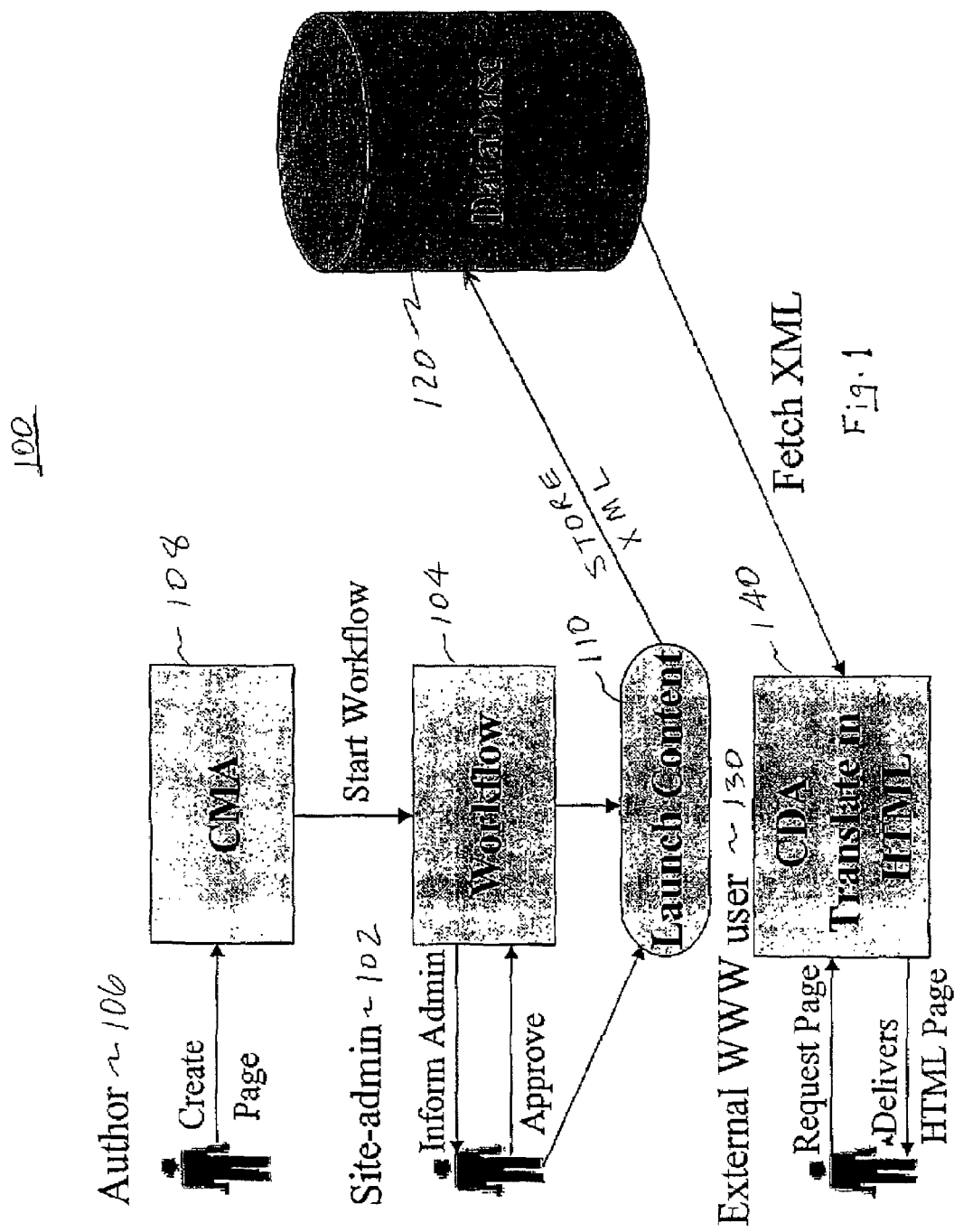
FIG. 1 is an exemplary representation of the workflow and page storage aspect of the present invention.

Referring now to FIG. 1, there is shown at 100 an exemplary representation of the flow diagram of the information architecture system of the present invention. The site administrator 102, initiates a project to develop a new web page by assigning an author 106 to create the page and its XML representation is stored in the database using a content management application system 108. This starts the workflow 104 whereby the author creates the page, then the author submits it for approval through various levels. Once the approvals are obtained, the site administrator 102 approves a content launch 110. While various scripting languages may be used in creating content and/or a page, by way of example only and not by way of limitation, the content/page is written in the eXtensible Markup Language (XML) and is stored in database 120 as an XML file.

An external web user 130 wishing to access the information contained in the page would request the page through a Content Delivery Application (CDA) translator 140. The CDA translator 140 would query the database 120, retrieve the page and translate the XML file into an HTML page or any other presentation format suitable for user's device for presentation to the user 130.

Figure 2:
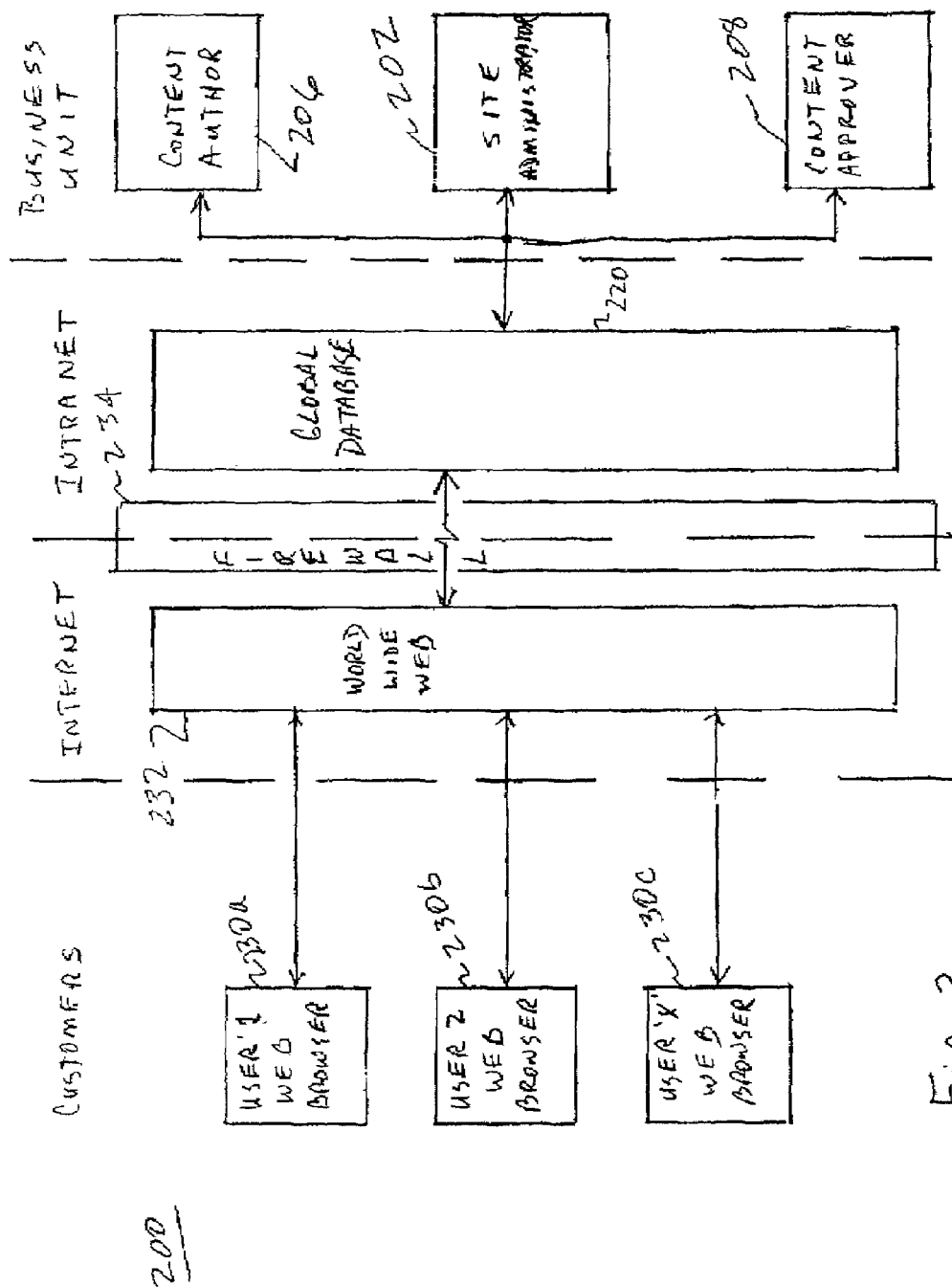
FIG. 2 is an exemplary block diagram depicting an embodiment of the Information Architecture System using Content Management of the present invention.

Referring now to FIG. 2, an exemplary embodiment of the present invention is shown at 200. This embodiment uses a workflow group, such as shown in FIG. 1, under control of the local site administrator 202. The workflow group includes a content author 206 and content approvers 208. Once the site administrator 202 initiates a project and verbally communicates the user ID and password to each new user designated in the workflow, designated content author 206 creates and edits items using content management applications.

Designated content approvers 208 review the content items produced by content author 206 and pass them through an approval process. Content approvers 208 mark the items as approved or rejected and, when the new content has been approved by all concerned users in the workflow, local site administrator 202 launches the content to the global database 220. Users, using web browsers 23a, 23b, 23c, interface through the worldwide web 232 to review the launched content. In some instances, the request may be processed through a firewall 234 providing security to the global database 220. Again, the XML file from the global database containing the requested information is processed through a CDA translator into HTML, or a representation suitable for the user's device, passed through the firewall 234 and presented in an HTML or suitable representative language format on the worldwide web 232 for access by the web user requesting the information.

Figure 3:
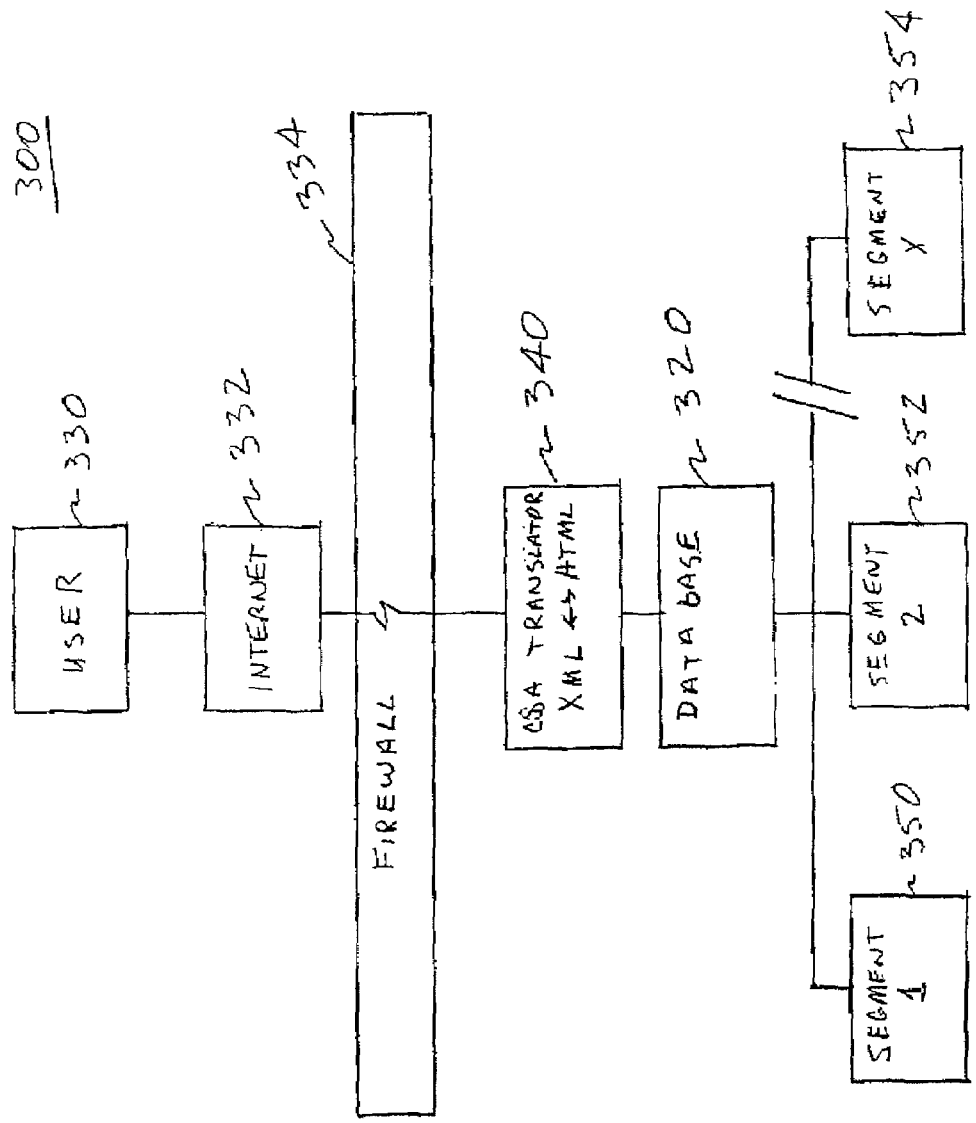
FIG. 3 is an exemplary block diagram depicting a user accessing the global database of the Information Architecture System.

Referring now to FIG. 3, there is shown an exemplary block diagram at 300 of a user accessing the global database of the network architecture system of the present invention. A user 330 connects to the internet or worldwide web 332, logging on through a firewall 334, if such is present, to a CDA translator to request information from database 320. The database, comprising various XML files relating to the various pages stored therein in XML, as Segment 1, 350, Segment 2, 352 through Segment X, 354. Once the proper segment containing the requested page is located, it is transmitted from the database 320 to the CDA translator, which translates the XML file to, for example, an HTML page for presentation through the firewall 334 to the internet 332 for presentation to user 330.

Figure 4A:
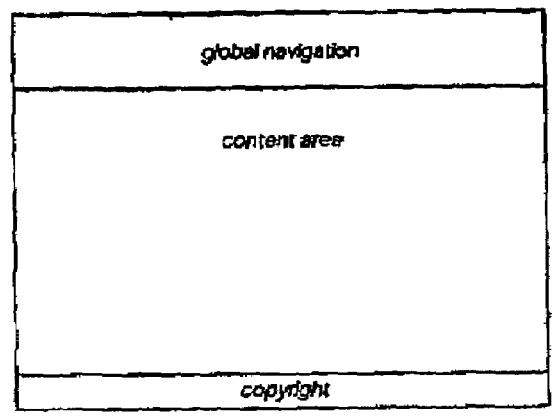
FIGS. 4a-4c are exemplary screen presentations provided by a user of the Information Architecture System.
Figure 4B:
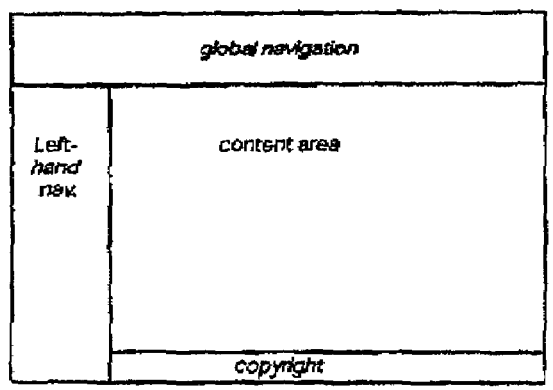
Figure 4C:
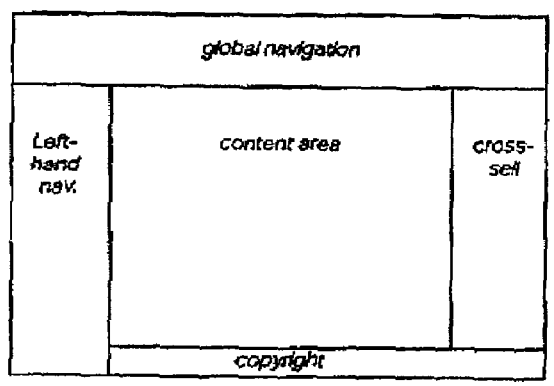

Referring also to FIGS. 4a-4c, exemplary screen presentations accessible by user of the network architecture system are shown. The presentations 4a, 4b, 4c correspond to the various segments 350, 352, 354 depicted in FIG. 3 comprising the information relating to the content contained within the page.

Figure 5:
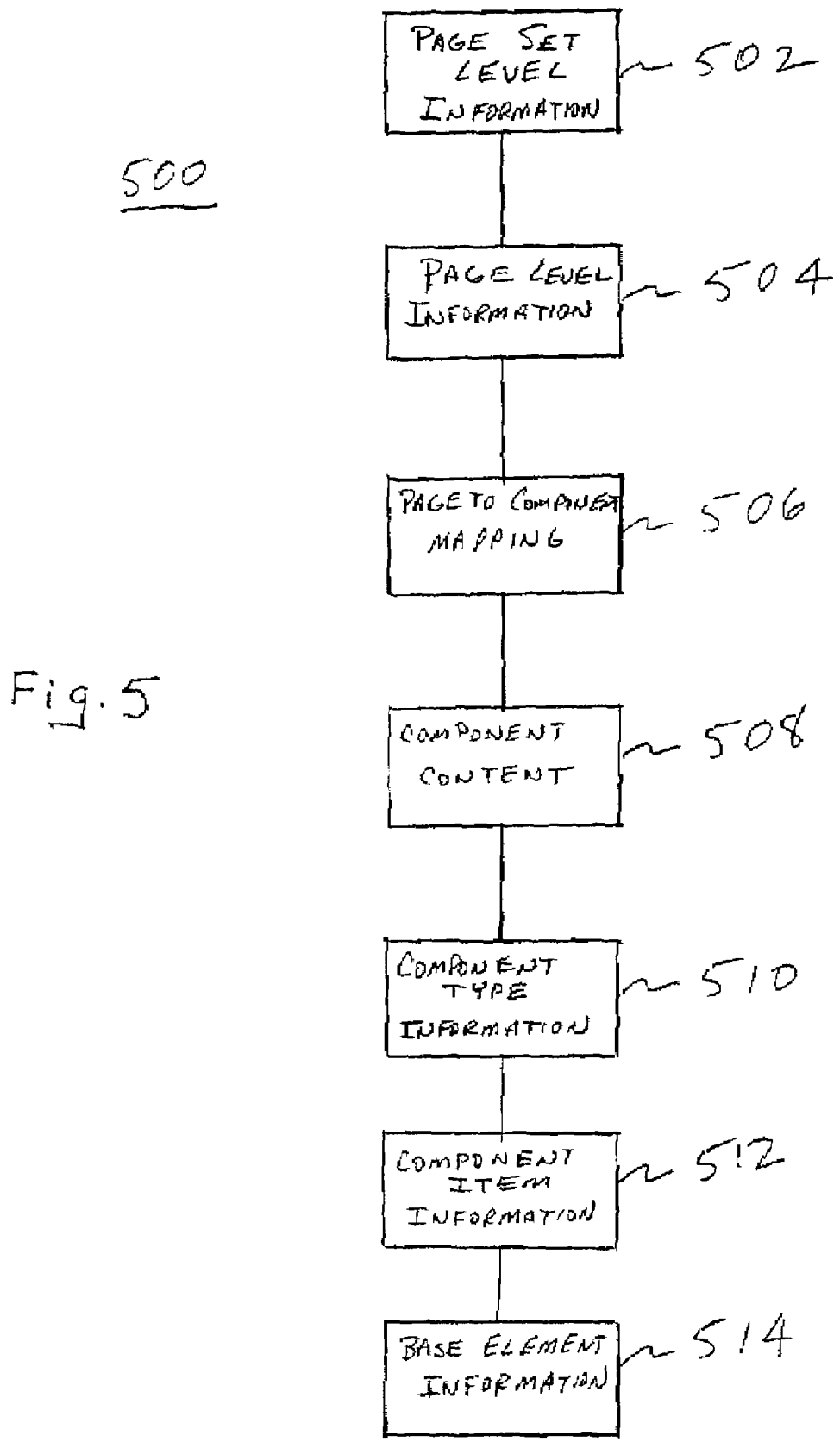
FIG. 5 is an exemplary workflow diagram depicting a logical data model of the information architecture.

Referring now to FIG. 5, each exemplary information segment shown in FIG. 3 may be seen to include a top level index to the information contained within the page/segment at 502. The page index defines the location of page level information at 504. Page level information 504 defines segment component mapping at 506. Information contained within page component mapping 506 relates to component content information 508. Component content information 508 contains information relating to the various parts of a page, such as the navigation components, the cross-sell components, copyright components, and the like. Additionally, the component content information 508 includes page key word relationships, along with the component type information 510. Component type information 510 further defines the component item information used in generating various items within a page. Base element information 514 provides information used in developing the component item information 512.

Accordingly, corresponding structures, acts, and equivalents of all elements in the claims below are intended to include any structural material or acts for performing the functions in combination with other elements as specifically claimed. The scope of the invention should be determined by the allowed claims and their legal equivalents, rather than by the examples given above.

What is claimed is:

1. A computer-implemented method for managing digital content for a company website on a global basis, including the steps of:

receiving, at a content management application, a request to create updated content for a content page within said company website, wherein said updated content comprises components;

creating said components according to said request;

storing each of said components within a markup language file in a database globally accessible by a reviewer, wherein said components are decoupled from said content page;

routing said components to said reviewer, wherein each of said components is individually routed;

creating an updated content page when each of said components has been authorized, wherein said updated content page does not include said components and comprises content mapping data which includes instructions for mapping said components to said updated content page;

receiving, from a computer of a user, a request to view said updated content page;

retrieving a category tag click count for at least one of said components corresponding to said user;

analyzing said category tag click count to determine a level of interest for establishing user preferences;

retrieving said components according to said user preferences, wherein each of said components includes a category tag corresponding to said user preferences; and positioning said retrieved components on said updated content page according to said content mapping data.

2. The method of claim 1, wherein said markup language file is in the eXtensible Markup Language (XML) format.

3. The method of claim 1, further comprising translating said markup language file from a eXtensible Markup Language (XML) format to an HTML format for presentation on said company website.

4. The method of claim 1, wherein storing said components as said markup language file includes storing said markup language file in an extensible database that is platform and software independent.

5. The method of claim 1, wherein storing said components as said markup language file includes storing said markup language file, wherein said markup language file is an XML file, in an extensible database that is platform and software independent.

6. The method of claim 1, further comprising translating said markup language file from a first markup language format to a second markup language format for presentation on said company website.

7. The method of claim 1, wherein said components comprise at least one of content components, cross-sell components, and navigation components.

8. A computer-readable storage medium containing a set of instructions for a general-purpose computer comprising:

receiving, at a content management application, a request to create updated content for a content page within said company website, wherein said updated content comprises components;

creating said components according to said request;

storing each of said components within a markup language file in a database globally accessible by a reviewer, wherein said components are decoupled from said content page;

routing said components to said reviewer, wherein each of said components is individually routed;

creating an updated content page when each of said components has been authorized, wherein said updated content page does not include said components and comprises content mapping data which includes instructions for mapping said components to said updated content page;

receiving, from a computer of a user, a request to view said updated content page;

retrieving a category tag click count for at least one of said components corresponding to said user;

analyzing said category tag click count to determine a level of interest for establishing user preferences;

retrieving said components according to said user preferences, wherein each of said components includes a category tag corresponding to said user preferences; and positioning said retrieved components on said updated content page according to said content mapping data.

* * * * *